United States Patent [19]

Berchtold

[11] B 3,999,216

[45] Dec. 21, 1976

[54] MATERIAL FOR MAGNETIC TRANSDUCER HEADS

[75] Inventor: Jean Berchtold, La Jolla, Calif.

[73] Assignee: Spin Physics, Inc., San Diego, Calif.

[22] Filed: July 30, 1970

[21] Appl. No.: 59,512

[44] Published under the second Trial Voluntary Protest Program on March 16, 1976 as document No. B 59,512.

[52] U.S. Cl. .............................. 360/125; 252/62.56
[51] Int. Cl.$^2$ ...................... G11B 5/22; G11B 5/14
[58] Field of Search ............................ 179/100.2 C; 340/174.1 F; 346/74 MC; 252/62.51, 62.55, 62.59, 62.56; 29/603, 602, 595

[56] References Cited

UNITED STATES PATENTS

| | | | |
|---|---|---|---|
| 2,801,942 | 7/1957 | Nachman .................... | 179/100.2 C |
| 2,992,474 | 7/1961 | Adams ........................ | 179/100.2 C |
| 3,262,763 | 7/1966 | Bechtold ..................... | 75/205 |
| 3,417,386 | 12/1968 | Schneider ................... | 179/100.2 C |
| 3,424,685 | 1/1969 | Pierrot ........................ | 252/62.56 |
| 3,469,942 | 9/1969 | Henneberger et al. ......... | 252/62.56 |
| 3,472,655 | 10/1969 | Fuchs et al. ................. | 75/205 |
| 3,557,266 | 1/1971 | Chiba et al. ................. | 252/62.56 |

FOREIGN PATENTS OR APPLICATIONS

| | | | |
|---|---|---|---|
| 1,437,301 | 6/1965 | France ........................ | 75/205 |

Primary Examiner—Alfred H. Eddleman
Attorney, Agent, or Firm—B. D. Wiese

[57] ABSTRACT

A magnetic head assembly wherein the material of the pole tips or of the pole pieces comprises a hot-pressed sintered iron-silicon-aluminum alloy, the particles of such alloy preferably being provided with a nitride layer or coating prior to sintering for preventing or retarding grain growth during sintering and to provide increased electrical resistivity and hardness in the end product. The preferred hot-pressed sintered material is characterized by a substantially uniform grain size most preferably of between about 40 microns and 60 microns, a porosity of substantially less than one percent, a Vickers hardness greater than 600, and a resistivity of at least about 100 micro-Ohm-cm.

A method of making such a sintered material preferably comprises heating an iron-silicon-aluminum alloy powder in an atmosphere of nitrogen to form a nitride layer thereon, blending 80% of such nitrided alloy powder with from about 10 to 20% of elemental iron, silicon and aluminum powders, without varying the composition from that desired in the final alloy, and heating the mixture to a sintering temperature while applying a pressure of about 1000 pounds per square inch.

6 Claims, 5 Drawing Figures

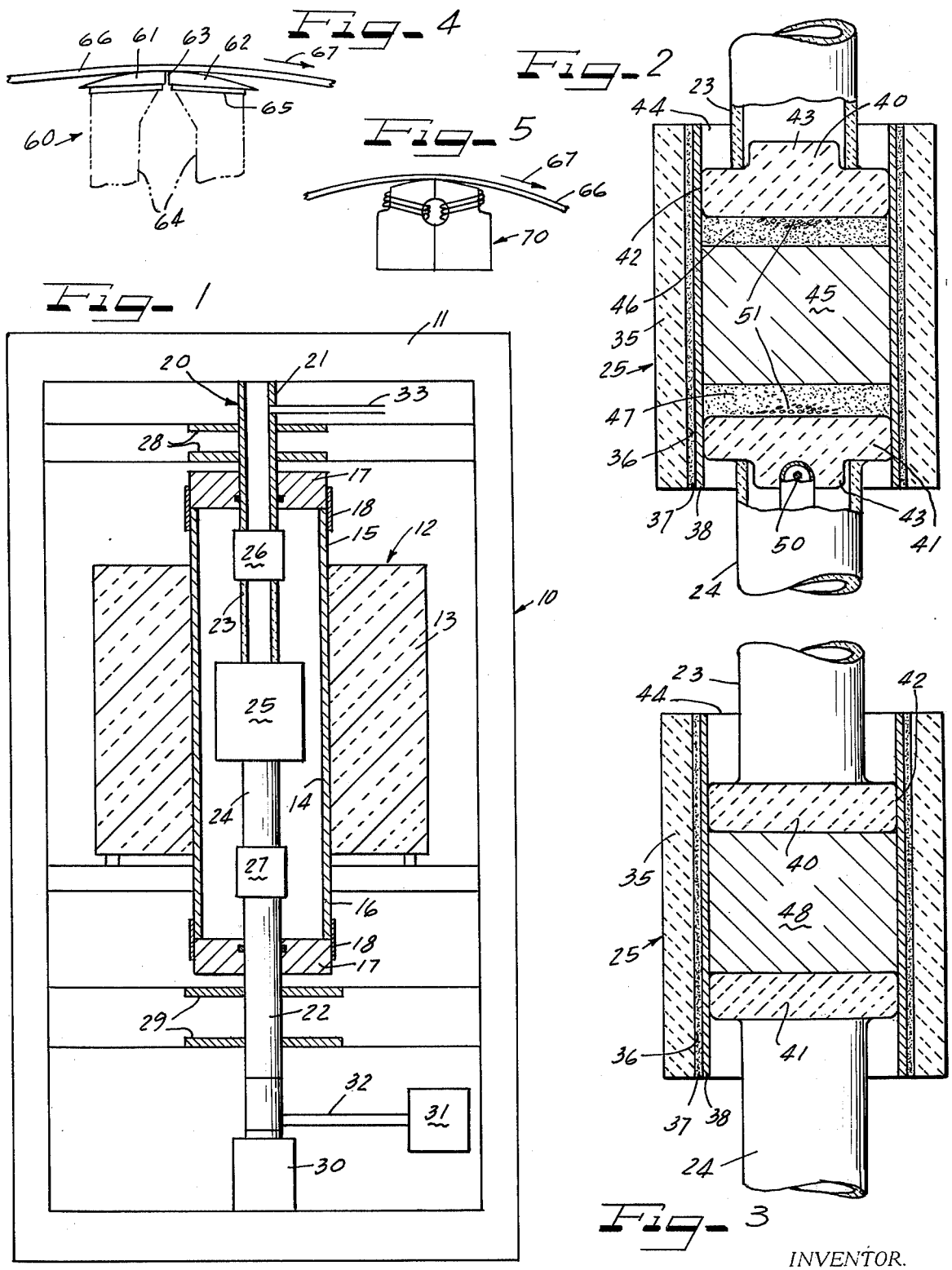

3,999,216

MATERIAL FOR MAGNETIC TRANSDUCER HEADS

CROSS REFERENCES TO RELATED APPLICATIONS

A commercial magnetic head assembly in which the hot-pressed sintered material of the present invention may be used is disclosed in a commonly owned pending application for patent U.S. Ser. No. 23,157 filed Mar. 27, 1970.

BACKGROUND OF THE INVENTION

An iron-silicon-aluminum alloy known as Sendust is available commercially and is formed by a fusion casting process. A magnetic head assembly utilizing pole tips of such material is disclosed in Robert A. Schneider U.S. Pat. No. 3,417,386 issued Dec. 17, 1968. The casting process used in forming this material generates voids within the ingot due to shrinkage; also the limited cooling rate is responsible for grain enlargement. In addition the differences in the cooling rate within the volume of the cast ingot produces large variation in grain size.

Prior workers have experimented with the sintering of iron-silicon-aluminum alloys, as evidenced by the disclosures of U.S. Pat. No. 2,988,806, issued June 20, 1961, and U.S. Pat. No. 2,992,474, issued July 18, 1961. A serious drawback of such sintered material for magnetic recording heads, however, is its high degree of porosity. Furthermore, both the cast alloy material and the sintered material found in the prior art exhibit a lack of cohesion between the grains, which is observed as a lesser degree of physical hardness than would be optimum for the tape contacting surface of a magnetic head assembly.

SUMMARY OF THE INVENTION

The present invention, by utilizing substantial mechanical pressure during the sintering process produces a hot-pressed sintered magnetic material for magnetic heads which has negligible porosity. Quite unexpectedly it has been discovered that by exposing the alloy powder to a nitrogen atmosphere prior to sintering, there is a virtual absence of grain growth in comparison to the size of the original alloy particles, while still achieving negligible porosity. Further, the physical hardness of the sintered material is substantially increased. Thus the material is remarkably suited for use in magnetic heads.

The present invention, therefore, relates to an improved magnetic head assembly wherein at least the pole tips are formed of a sintered iron-silicon-aluminum material, to a hot-pressed sintered material particularly useful in the magnetic recording field, and to a method of preparing the same.

It is an important object of the present invention to provide an improved magnetic head assembly wherein at least the pole tips are formed of a magnetic material characterized by markedly increased density and physical hardness.

Another object is to provide a magnetic head assembly comprised of a silicon-iron-aluminum material which is relatively free of stress and is capable of a longer working life under magnetic tape contacting conditions.

A further object is to provide a magnetic material for a magnetic head suitable for operation in the megahertz range while providing improved gap stability and high resolution.

Still other objects relate to the provision of a sintered iron-silicon-aluminum material of reduced porosity and increased physical hardness, and to a method of making the same.

A feature of the invention resides in the application of a nitrogen-containing coating to particles to be sintered for the purpose of minimizing grain growth during the sintering operation. A preferred method is to subject the particles to a nitrogen atmosphere at a sufficiently elevated temperature to produce a substantial nitride coating. (Formation of this coating is evidenced by a large increase in resistivity of the bulk powder after treatment).

BRIEF DESCRIPTION OF THE DRAWINGS

FIG. 1 is a partial somewhat diagrammatic elevational view, partly in section, of apparatus suitable for carrying out the method of my invention;

FIG. 2 is an enlarged fragmentary, vertical sectional view of the mold assembly of FIG. 1 for carrying out a combined heating and pressing operation in the preparation of a hot-pressed sintered compact of a ternary aluminum-iron-silicon alloy suitable for further processing in accordance with my invention;

FIG. 3 is a view similar to that of FIG. 2 but illustrating a modification of the hot-pressing sintering operation;

FIG. 4 is a side elevational view partly in phantom outline of a magnetic head assembly including a magnetic pole piece of my hot-pressed sintered alloy material; and FIG. 5 is a view similar to that of FIG. 4 in which the pole piece is wholly constructed of my magnetic hot-pressed sintered alloy material.

DETAILED DESCRIPTION OF THE PREFERRED EMBODIMENTS

In FIG. 1 the reference numeral 10 indicates a hot press assembly having an enclosing frame 11, within which is mounted a vertically upright tubular furnace 12 which may be of any suitable construction having a heavily insulated tubular wall 13 surrounding an axially extending muffle tube 14, the upper and lower portions 15 and 16 of which extend above and below the extremities of said wall 13. The upper and lower ends of said muffle tube 14 are closable by cooperating sliding seals 17 and static seals 18.

A composite ram, designated as a whole by the reference numeral 20, is mounted axially of the muffle tube 14. Said ram 20 comprises an upper metal tube 21, a lower metal tube 22, an upper ceramic tube 23 and a lower ceramic tube 24, with a mold assembly 25 in operative alignment with said ceramic ram tubular portions 23 and 24 and with sleeves 26 and 27 cemented or otherwise fixedly joined as couplers to the contiguous ends of said corresponding metal and ceramic tubes to form upper and lower composite ram structures. Upper ram guide bearings 28 and lower ram bearings 29 serve to mount the composite ram 20 for limited axial movement of the lower metal tube 22 relative to the upper metal tube 21.

A hydraulic cylinder, schematically illustrated at 30, controllably functions to exert the desired pressure upon the sintered material to be hot pressed or to be sintered and hot-pressed within the mold assembly 25 in a manner later to be described herein in greater detail. A vacuum pump 31 is connected by a line 32 to the interior of the lower ram tube 22 to draw out gases therefrom at any desired rate of flow. Such gases may be those introduced through an intake line 33 into the upper ram tube 21 for creating the desired atmosphere in the mold assembly 25.

Such atmosphere can, for instance, be an inert atmosphere provided by argon, helium or other inert gas or hydrogen drawn into the mold assembly through the intake 33 by the action of the suction pump 31. As another example, one of the aforementioned gases substantially at atmospheric pressure could be supplied to the mold assembly via intake 33, in which case the suction pump 31 would not be required. A weak flow of an inert gas serves to sweep out any moisture and oxygen from the mold assembly 25 prior to and during the hot pressing operation. For the purposes of my hot-press and/or sintering operation, hydrogen can be used as a suitable sweeping gas. As will be explained more fully later on, nitrogen could also be used in the mold assembly, introducing the previously mentioned gases at higher temperature during sintering, but where a nitrided alloy or alloy component, is desired, the nitriding step can be carried out with greater facility on particles of the initial alloy in a separate and prior operation from that of hot-pressing.

The mold assembly 25 is illustrated in greater detail in FIGS. 2 and 3, wherein the mold proper comprises an open-ended high strength ceramic cylinder 35 which may suitable be formed of a highly refractory alumina, or alumina-containing material, capable of withstanding pressures in excess of 1000 pounds per square inch at temperatures in excess of 1200° C. To function suitably as a die wall under those conditions the cylinder 35 can best be made of aluminum oxide that has been cold compacted isostatically and then sintered to give a dense alumina mold wall of about 99.5% pure alumina.

While the inner surface 36 of the cylindrical die wall can be employed as the surface of the mold, or die, it is preferable to line the ceramic wall for best results in the hot-pressing of my preferred magnetic alloy whether the hot-pressing is carried out after, or simultaneously with the sintering step. To this end a fired refractory powder, such as alumina particles, is bonded to the exterior surface of a liner 38 temporarily by application of the alumina particles as a watery paste, to form a thin smooth-surfaced layer 37. The liner 38 which provides a smooth refractory metal surface may comprise a thin molybdenum tube or a molybdenum foil of 2 mils thickness, or a sprayed layer of molybdenum, or of some other highly refractory metal or alloy, such as tungsten or tantalum.

A porous, high strength ceramic disc 40 is fixedly positioned as a piston head in the lower end of the upper ram portion 23 and a similar disc or head 41 is fixedly carried by the upper end of the lower ram portion 24. These heads 40 and 41 are substantially identical, each having an enlarged solid cylindrical portion 42 providing a close, sliding fit with the liner 38 and having a reduced diameter short stem portion 43 fixedly received in and retained by the corresponding end of the tubular ram portions 23 and 24. The heads 40 and 41 are made of sufficiently porous refractory material to permit the passage therethrough of a slow flow of gases for the purposes previously set forth herein. The rate of flow of such gases through the heads 40 and 41 is not critical. A flow rate of about one liter per minute, for example, is convenient from the standpoint of removing the air present at the start of a sintering operation.

In the preparation of the magnetic alloy for making my magnetic head assembly, the constituents of the alloy are the following and are processed as indicated in the following example:

EXAMPLE I

The starting material may include an iron-silicon-aluminum alloy containing by weight from 4 to 6.5% and preferably about 5.6% of aluminum; from 8 to 11% and preferably about 9.6% of silicon and the balance essentially iron, viz. about 84.8% iron. Minor amounts of other constituents can be included as impurities or as conventional additives buy are not essential to impart thereto the properties that are desired in my magnetic alloy. As will be explained later, however, in preparing my most preferred magnetic alloy composition after a suitable alloy powder has been formed, the alloy powder is to some extent at least nitrided, or provided with a nitride layer.

As a first general step in the preparation of my magnetic material, a powder of the above-described starting alloy, having a composition of 5.6% Al, 9.6% Si and 84.8% Fe, is produced if not already in the form of a powder. The powder preferably is of a particle size somewhat coarser than 325 mesh (Tyler Standard Screen Scale) or coarser than about 40 microns maximum dimension, and, in general between +325 and −250 mesh, the latter mesh size representing a particle size of about 60 microns maximum dimension. The mesh size can be anywhere between about 10 microns as a practical minimum and 500 microns as a practical maximum dimension but for best results in the processing of any given batch of the starting alloy, the particle size for that batch should be within a rather narrow range of from 50% either way of the mean particle size.

In forming this initial alloy powder, it is preferable to melt the individual elements in their relative ratio, as for instance in an induction furnace having an inert gas or hydrogen atmosphere, and then run the molten alloy from the furnace into water to produce granules of the alloy and then subdivide the granules to the desired particle size by impact milling.

The powdered initial alloy is then mixed with about 10 to 20% by weight of iron, silicon and alluminum as elemental powders (most preferably in proportions by weight of 80% initial alloy and 20% elemental powders) and thoroughly blended to provide a homogeneous mixture of the desired final composition. No binder, such as a resin, agglutinate or other adhesive material is added to the mixture, and the composition of the final mixture is kept substantially within the ranges, for Al, Si and Fe above-given in this Example I. The particle sizes of the initial alloy, and of the elemental silicon, aluminum and iron can all be within the same close size ranges specified above but the alloy powder is most preferably within a range of about 40 to 60 microns, while the iron powder is most preferably of particle size finer than 325 mesh (Tyler Standard Screen Scale), that is finer than about 40 microns maximum dimension. The silicon and aluminum powder can suitably be relatively coarse, for example finer than 100 mesh, the particles thus being finer than about 150 microns maximum dimension. Iron is preferably of the fine particle size indicated because of its slow rate of diffusion during hot-pressing.

As to the purities of constituents, the iron is preferably 99.5% pure; and therefore low in carbon, sulfur and phosphorus; the silicon is typically of 99.9% purity and the aluminum typically of 99% purity. The metallic impurities in the aluminum powder are typically about 0.1%, the higher one percent impurity value taking into account possible oxidation of the aluminum.

If the final magnetic alloy need not possess all of the advantageous magnetic and physical properties previously set forth, the constituents need not be subjected to a nitriding step, but a nitrided alloy is much preferred and its preparation will be described in Example II.

In preparing the apparatus illustrated in the drawings for making a hot-pressed sintered alloy for use in my magnetic head assembly, the powdered mixture of the initial alloy and from 10 to 20% by weight of elemental iron, silicon and aluminum, as a homogeneous blend of the powders within the particle size ranges specified, is charged into the chamber of the mold assembly 25 above the lower ceramic ram 24 to be supported by the ram head 41. The blend of powders to be hot-pressed or to be contemporaneously sintered and hot-pressed therein should be free of any binder. During the charging of the mold cavity, the upper ram assembly including the ram 23 and head 40 is withdrawn and the powder mixture fed in through the open upper end 44 of the mold tube 35. The upper ram assembly is then positioned in place and the charge in the mold assembly is subjected to the required temperature and pressure to effect the combined hot-pressing and sintering of the powdered charge, or the hot-pressing of a presintered charge into a high density compact of high surface hardness, low porosity and high resistivity, all as herein described.

In FIG. 2 a stage in the hot-pressing operation has been reached in which the material has been constricted to about 55% of its original volume and has been sintered and hot-pressed into a compact 45. Layers 46 and 47 of uncompacted refractory alumina powder, respectively above and below the compact 45, serve to isolate getter particles 51 from the alloy. A preferred choice for the material of the getter particles 51 is titanium. The layers 37, 46 and 47 are so highly refractory as not to sinter but remain as powder. The layer 37 greatly simplifies removal of the sintered compact 45 from the mold 25.

At the completion of the hot-pressing and sintering operation, the upper ram assembly is raised to permit the removal of the final compact 45. The compact is then in the form of a body of mechanically hard, magnetic material which can be cut into wafers; the wafers lapped to the desired lamination thickness and annealed; and other processing steps performed as described in the aforementioned pending application Ser. No. 23,157, filed Mar. 27, 1970, now U.S. Pat. No. 3,614,339 issued Oct. 19, 1971.

During the operation that has just been described in more or less general terms, the powder mix in the mold chamber is subjected to a pressure of about 1000 pounds per square inch or more, as for instance 1200 p.s.i. The volume of the powder decreases by about 55% as the sintering temperature is reached, as measured by a thermocouple 50 positioned in the underside of the lower ram head 41, (FIG. 2). In general the sintering temperature will be about 15° C. to 30° C. below the actual melting point of the alloy, which if of the composition herein set forth, is typically about 1235° C. Thus, to achieve minimum porosity the temperature should be above 1205° C. and preferably about 1220° C. as measured by the thermocouple 50.

A mechanical pressure of about 1000 pounds per square inch is applied, and the temperature in increased to about 1220° C. and is maintained over a period of about 6 to 12 hours after the piston heads 40 and 41 have reached substantially their maximum relative displacement toward each other. The mold assembly is allowed to cool while mechanical pressure is maintained and the hot-pressed sintered mass in the form of a dense compact 45 is removed and processed as described above. The provision of the metal foil 38 and refractory powder 37 facilitates the removal of the compact 45.

In addition to providing a slow flow of about one liter per minute of an inert gas, such as argon, through the mold assembly to sweep out oxygen and/or moisture, a getter of titanium powder can optionally be provided in the mold chamber to react with and reduce the amount of oxygen and/or moisture trapped in the system. The positioning of a getter 51 is indicated in FIG. 2. Fired alumina particles in the layers 46 and 47 inhibit any alloying of the getter with the powder in the mix undergoing sintering and/or hot-pressing.

FIG. 3 shows the mold assembly 25 used for sintering and compressing the material of Example I into a final compact 48. In this embodiment, the getter particles 51 are omitted together with the isolating layers 46 and 47. It is found that where care is exercised in minimizing the presence of oxygen and water the apparatus can still achieve the results explained herein without the use of the getter particles.

EXAMPLE II - NITRIDING THE ALLOY

Except for the added preliminary step of nitriding the initial alloy powder in making up the final blend for sintering, the remaining steps of this Example II are generally carried out in the same manner as described in connection with Example I.

The novel and unexpected results that flow from the addition of the nitriding step are: a smaller and more uniformly fine grain size as a result of the inhibiting effect upon grain growth of the nitridation of the alloy powder; a higher hardness of the final hot-pressed sintered compact in the neghborhood of a Vickers hardness of about 650 kg/mm$^2$ for a 300 gram loading (as compared with a Vickers hardness of only about 560 kg/mm$^2$ for an ingot of commercial cast "sendust"); an initial premeability above 15,000 at 100 hertz and within 30% of theoretical (as calculated from the low frequency value) at 5 megahertz; and a resistivity of about 110 micro-Ohm-centimeters (versus a resistivity of about 80 micro-Ohm-centimeters for a cast alloy of the same composition). Thus, nitriding is effective in preventing grain growth during hot-pressing and sintering and in increasing electrical resistivity and hardness.

Also, where nitridation is carried out, the final sintered and hot-pressed compact is almost void-free, having a porosity of considerably less than 1 vol. % and most generally of not over 0.1 vol. %. The method of determining porosity is explained below under the heading "Definitions."

The nitriding of the final magnetic alloy can be best accomplished by a preliminary nitriding of the initial alloy in finely divided form employing a nitriding atmosphere of nitrogen or of nitrogen and hydrogen such as a mixture of 82 vol. % of nitrogen and 18 vol. % of hydrogen, (although for some purposes, the blend of the constituent powders, comprising the powdered initial alloy and the added 10 to 20% of elemental metal powders can be subjected to the nitriding atmosphere). Nitriding is thus preferably carried out as a separate step ahead of the hot-pressing and sintering operation. In the nitriding operation, the alloy powder is subjected to an atmosphere of $N_2$, or preferably $N_2 + H_2$, of low dew point, and at a suitable nitriding temperature such as about 640° C. Heating is continued at about 640° C. in the nitriding atmosphere for at least 4 hours or until an appreciable nitride layer is formed on the alloy powder.

The pre-nitrided alloy particles are preferably, however, blended with approximately 20% by weight of powders in their elemental, unnitrided state and in proportions such as to maintain the previously given percentages of Al, Si and Fe. The nitride layer on the alloy powder effectively isolates the particles from one another to increase the resistivity of the powder compressed between electrodes almost a million times, or from about 40 Ohm-centimeters in the non-nitrided state, to $30 \times 10^6$ Ohm-centimeters in the nitrided state.

As is normally expected the nitriding could take place at a higher temperature and for a shorter time interval. For example a nitriding operation might be effected at a temperature of the order of 700° centigrade and for a shorter time interval, such as 1 hour. It may be noted that the alloy powder prior to nitriding has a metallic gray color, while after nitriding the powder has a yellowish tint. It is found that the nitriding step not only causes a virtual absence of growth in grain size during sintering, but also, most fortunately, does not interfere with the desirable magnetic qualities which render the material highly suitable for the pole tips of magnetic recording heads and magnetic playback heads.

In FIG. 4, the reference numeral 60 indicates a composite magnetic head assembly, or transducer, having a pair of pole tips 61 and 62 of my magnetic material separated by a gap 63, and a two part ferrite core 64. The pole tips 61 and 62 are bonded to the ferrite core parts 64 by a suitable non-magnetic bonding layer 65, which may be a resinous material such as an epoxy resin composition. A tape record medium 66 is illustrated as traveling in the direction of the arrow 67 over and in contact with the arcuate surface of said pole pieces 61 and 62 and across the gape 63, therebetween.

FIG. 5 shows a unitary pole piece 70 constructed entirely of the hot-pressed, sintered magnetic compacts of my invention. These compacts as initially formed occupy a volume of at least 1 cubic inch, for example, 4 cubic inches. Hot-pressed, sintered compacts of a larger volume can be made by the use of the method and by scaling up the apparatus herein described.

Such hot-pressed sintered compacts can be subjected to the lamination fabrication and annealing techniques that are set forth in the aforesaid application Ser. No. 23,157 filed Mar. 27, 1971 now U.S. Pat. No. 3,614,339, issued Oct. 19, 1971, which is incorporated herein by reference.

DEFINITIONS

Porosity and Density

The ratio of pore area to total area visible on a polished surface of a sample region of a material under consideration may be obtained by microscopic inspection. (It is known that the area porosity value so obtained is essentially identical to the value of volume porosity for the same sample region.) The term "porosity" as used herein with respect to a given body of sintered material is expressed as a percentage value and is obtained by determining the proportion of pore area to total area for a number of sample areas of the material adequate to provide a reliable indication of the volume porosity for the entire body.

Typical densities for the preferred hot-pressed sintered material whose composition is given herein (about 5.6% by weight aluminum, 9.6% by weight silicon and 84.8% by weight iron) are between about 6.97 and 7.01 grams per cubic centimeter. In general, the preferred hot-pressed sintered materials of my invention will have densities greater than the density of the fusion-cast ingot of the same composition and volume. A typical density for the hot-pressed sintered compact 45, FIG. 2, or 48, FIG. 3, would be at least 99.9%, corresponding to a porosity of below 0.1%. Such porosities which are substantially less than the porosity of the presently commercially available fusion-cast ingot of the same composition and volume are herein termed "negligible."

Uniform Grain Size

The term "grain size of a substantially constant dimension" or of a "substantially uniform dimension" is used herein to refer to the sintered material produced by the present invention and is intended to refer to the relatively markedly improved uniformity obtained with the present invention wherein the grain size does not vary by more than plus and minus 50% from the mean grain size. Preferably with a mean grain size of about 50 microns, the grain size does not vary by more than about plus and minus 20%, that is from about 40 microns to about 60 microns. Essentially, with the present invention, there is a virtual absence of growth in grain size during sintering from that corresponding to the size of the original alloy particles. Thus the grain size of the sintered material is virtually identical to that of the original alloy particles over the entire volume of the hot pressed sintered compact 45 or 48. (A convenient size for the compact 45 or 48 is about four cubic inches with the particular equipment that applicant has used.) The rectangular bar formed from the compact 45 or 48 in accordance with the process of the aforementioned copending application Ser. No. 23,157, filed Mar. 27, 1970, would also have a grain size of substantially uniform dimension throughout its volume.

Resistivity of the Bulk Alloy Powder

The reference to the resistivity of the alloy powders after the treatment in the nitrogen atmosphere is herein defined as the resistivity of the powder when compressed between electrodes under a pressure of 2 atmospheres, that is 29.4 pounds per square inch. By way of example, where the iron-silicon-aluminum alloy powder, with a composition of 5.6% by weight aluminum, 9.6% by weight silicon and 84.8% by weight iron, had a resistivity as so measured of 40 Ohm-centimeters, the same alloy powder after the treatment in the nitrogen atmosphere exhibited a resistivity of $30 \times 10^6$ Ohm-centimeters (30 megohm-centimeters), when compressed between electrodes with a pressure of two atmospheres.

Sintering Temperature

The term "sintering temperature" refers to a temperature close to but below the melting point of the alloy being formed. For example in the case of an alloy having a melting point of 1235° C., the sintering temperature is in the range from about 1205° C to about 1220° C.

While a pressure of 0.15 Torr has been given for the atmosphere of the sintering chamber, more generally this pressure may be from about 0.15 Torr to about atmospheric pressure, for example; that is, the apparatus of FIG. 2 or 3 may be operated by flowing through the pressure chamber an inert gas at substantially atmospheric pressure or lower. While an inert gas such as argon is convenient, hydrogen is non-reactive with the metal powder, and could also be used.

With respect to the preparation of the alloy powder, a non-reactive atmosphere is suitable, for example an inert gas or hydrogen.

In accordance with one relatively broad aspect of the present invention, there is provided a sintered hot-pressed material formed predominantly from nitrided particles having a basic composition by weight of from 6 to 12% silicon, from 4 to 9% aluminum, and the remainder essentially iron, such material having a resistivity of at least 100 micro-Ohm-centimeters, a porosity of less than one percent and a Vickers hardness (measured at a 300 gram load) greater than 600.

It will be apparent that many modifications and variations may be effected without departing from the scope of the novel concepts and teachings of the present invention.

I claim as my invention:

1. A hot-pressed sintered magnetic material consisting essentially of an alloy having an aluminum content of 4 to 6.5% by weight and a silicon content from 8 to 11% by weight, with the remainder substantially iron, said sintered magnetic material being characterized by a porosity of substantially less than 1%, a Vickers hardness greater than 600 (measured at a 300 gram load) and a resistivity of at least 100 micro-Ohm-centimeters.

2. A magnetic head assembly comprising:
   a pole piece construction having a gap for coupling to a magnetic record medium,
   said pole piece construction being comprised of hot-pressed sintered magnetic material formed predominantly from nitrided particles of an aluminum-silicon-iron alloy, having a substantially increased resistivity (as compared with non-nitrided material) of at least about 100 micro-Ohm-centimeters,
   said pole piece construction having a porosity of substantially less than one percent and a Vickers hardness substantially greater than 600 (measured at a 300 gram load).

3. A magnetic head assembly as defined by claim 2, wherein
   said nitrided particles of the sintered magnetic material have a substantially uniform size varying not more than 50% from a mean grain size and lying within the range from about 10 microns to about 500 microns.

4. A magnetic pole piece formed of hot-pressed sintered magnetic material having an aluminum content of 4 to 9% by weight, and a silicon content of 6 to 12% by weight, with the remainder essentially iron, said hot-pressed sintered magnetic material having a porosity of less than about 0.1%, a Vickers hardness greater than 600 (measured at a 300 gram load), a grain size of a substantially uniform dimension within a size range of between about 40 microns and about 60 microns, a resistivity of at least 100 micro-Ohm-centimeters, and an initial permeability of about 15,000.

5. A magnetic transducer head assembly comprising:
   a pole piece construction having a gap for coupling to a magnetic tape record medium,
   said pole piece construction comprising a sintered magnetic material for sliding contact with the tape record medium and comprising predominantly a magnetic nitrided iron-silicon-aluminum alloy,
   the sintered magnetic material having a substantially uniform grain size varying not more than 50% from a mean grain size and lying within the range from about 10 microns to about 500 microns.

6. A hot-pressed sintered magnetic material comprising predominantly nitrided sintered grains of an aluminum-silicon-iron alloy, said mataerial having a resistivity of at least 100 micro-Ohm-centimeters, a porosity of less than 1 percent and a Vickers hardness substantially greater than 600 (measured at a 300 gram load).

* * * * *